US011708021B2

(12) United States Patent
Jiang et al.

(10) Patent No.: US 11,708,021 B2
(45) Date of Patent: Jul. 25, 2023

(54) SMALL-SIZED VEHICLE-MOUNTED PROJECTOR LIGHT SYSTEM

(71) Applicant: YEJIA OPTICAL TECHNOLOGY (GUANGDONG) CORPORATION, Dongguan (CN)

(72) Inventors: Cheng Jiang, Dongguan (CN); Jun She, Dongguan (CN); Jixue Nan, Dongguan (CN)

(73) Assignee: YEJIA OPTICAL TECHNOLOGY (GUANGDONG) CORPORATION, Dongguan (CN)

( * ) Notice: Subject to any disclaimer, the term of this patent is extended or adjusted under 35 U.S.C. 154(b) by 0 days.

(21) Appl. No.: 17/899,733

(22) Filed: Aug. 31, 2022

(65) Prior Publication Data

US 2022/0410793 A1 Dec. 29, 2022

Related U.S. Application Data

(63) Continuation of application No. PCT/CN2020/107966, filed on Aug. 7, 2020.

(30) Foreign Application Priority Data

Mar. 31, 2020 (CN) .......................... 202010247015.3

(51) Int. Cl.
*B60Q 1/24* (2006.01)
*F21S 43/20* (2018.01)
(52) U.S. Cl.
CPC .............. *B60Q 1/247* (2022.05); *F21S 43/26* (2018.01); *B60Q 2400/40* (2013.01)
(58) Field of Classification Search
CPC ....... B60Q 1/24–27; B60Q 2400/40–50; F21S 43/20–26
See application file for complete search history.

(56) References Cited

U.S. PATENT DOCUMENTS 10,670,864 B2 * 6/2020 Hirata .................. G02B 27/283
2019/0368678 A1 12/2019 Thombre

FOREIGN PATENT DOCUMENTS

CN 106439673 A 2/2017
CN 207922099 U 9/2018
(Continued)

OTHER PUBLICATIONS

International Search Report of PCT/CN2020/107966, dated Dec. 30, 2020.

*Primary Examiner* — Jason M Han
(74) *Attorney, Agent, or Firm* — Locke Lord LLP; Tim Tingkang Xia, Esq.

(57) ABSTRACT

A small-sized vehicle-mounted projector light system including an illuminating module having a light source, a collimating lens and a film arranged in sequence, and an imaging module; the imaging module includes a curved reflector being a concave mirror with positive focal power, and a first imaging lens. The main optical axis of the illuminating module passes through the reflective surface of the curved reflector, on one side of which the first imaging lens is positioned. The invention ensures an appropriate size of an one-way dimension, no consequence of the limited space within automobile structure during installation and design, and conveniency for arrangement; the curved reflector has positive focal power and can perfect focusing, not only ensuring good projection effect, but also decreasing the number of lenses with positive focal power in the system, and effectively reduce the volume and weight of the system.

10 Claims, 7 Drawing Sheets

(56) References Cited

FOREIGN PATENT DOCUMENTS

| CN | 110242929 A | 9/2019 |
| CN | 210165315 U | 3/2020 |
| CN | 111271685 A | 6/2020 |

* cited by examiner

SMALL-SIZED VEHICLE-MOUNTED PROJECTOR LIGHT SYSTEM

CROSS-REFERENCE TO RELATED PATENT APPLICATION

This application is a continuation application of International Patent Application No. PCT/CN2020/107966, filed on Aug. 7, 2020, which itself claims priority to Chinese Patent Application No. CN202010247015.3 filed in China on Mar. 31, 2020. The disclosures of the above applications are incorporated herein in their entireties by reference.

FIELD OF THE INVENTION

The invention relates to a projector light system, in particular discloses a small-sized vehicle-mounted projector light system.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle-mounted projector lights are generally arranged on the outside of an automobile body, serving as a Logo lamp or functioning as a welcome sign. Further, they can also be arranged in the front or rear of the automobile body to warn pedestrians or vehicles, as well as to make a certain decorative effect.

In the prior art, a projector light generally includes a light source coaxially arranged, a collimating lens, a film and a projection lens group. As shown in FIG. 1, due to the large axial dimension of the entire projector light system, the projector lights are mostly arranged on the rearview mirror, the bottom of the door or the footboard, of automobiles. When the projector light is arranged to illuminate the ground vertically to form a clear image, the optical axis of the projector light needs to be set perpendicular to the ground, so it is necessary to occupy a large space in the vertical dimension. However, the structures such as the rearview mirror and footboard of automobiles do not have enough space in the vertical dimension, shrinking the projector light with poor efficiency and performance, so it affect the projected pattern in luminous brightness, clarity and fidelity finally.

SUMMARY OF THE INVENTION

In order to solve the above-mentioned problems in the prior art, the present invention provides a small-sized vehicle-mounted projector light system to ensure an appropriate size of an one-way dimension, conveniency for vehicle-mounted arrangement, and a good projection effect.

The small-sized vehicle-mounted projector light system disclosed in the present invention includes an illuminating module and an imaging module. The illuminating module includes a light source, a collimating lens and a film, which are arranged in sequence. The imaging module includes a curved reflector and a first imaging lens, and the curved reflector is a concave mirror with positive focal power. The main optical axis of the illuminating module passes through the reflective surface of the curved reflector, and the first imaging lens is positioned on one side of the reflective surface of the curved reflector.

Preferably, the reflective surface of the curved reflector is an aspheric surface or a free-curved surface, either of which is rotationally symmetric.

Preferably, the normal line of the curved reflector and the main optical axis of the illuminating module form an included angle α, where 30°≤α≤60°.

Preferably, providing the effective aperture of the curved reflector is P, the effective aperture of the film is Q, and the equivalent focal length of the imaging module is f, the effective aperture P of the curved reflector conforms to $$\frac{2}{\sqrt{3}}Q < P < 2f.$$

Preferably, providing the focal length of the curved reflector is F, there is F>f.

Preferably, the first imaging lens is a convex lens.

In one embodiment, the first imaging lens is positioned on one side of the reflective surface of the curved reflector close to the illuminating module.

In another embodiment, the first imaging lens is positioned on one side of the reflective surface of the curved reflector far away from the illuminating module.

Further, the imaging module further includes a second imaging lens, and the second imaging lens is positioned between the first imaging lens and the curved reflector.

Preferably, the second imaging lens is a concave lens.

The present invention has the following beneficial effects. The small-sized vehicle-mounted projector light system enables the light path to be deflected and adjusted through the curved reflector, so as to ensure an appropriate size of an one-way dimension, no consequence of the space limited by the automobile structure to be installed thereon during installation, and conveniency for vehicle-mounted arrangement. In addition, the curved reflector has positive focal power and can perfect focusing, so the present invention not only ensures good projection effect, but also decreases the number of lenses with positive focal power in the projector light system. Meanwhile, it can effectively reduce the volume and weight of the projector light system, helping vehicle-mounted installation and application.

Where, 10—illuminating module; 11—light source; 12—collimating lens; 13—film; 20—imaging module; 21—curved reflector; 22—first imaging lens; 23—second imaging lens.

DETAILED DESCRIPTION OF EMBODIMENTS

In order to further understand the features, technical solutions, and achieved specific objectives and functions of the present invention, we will further describe the present invention in detail as follows in combination with the figures and specific examples.

Figure 1:
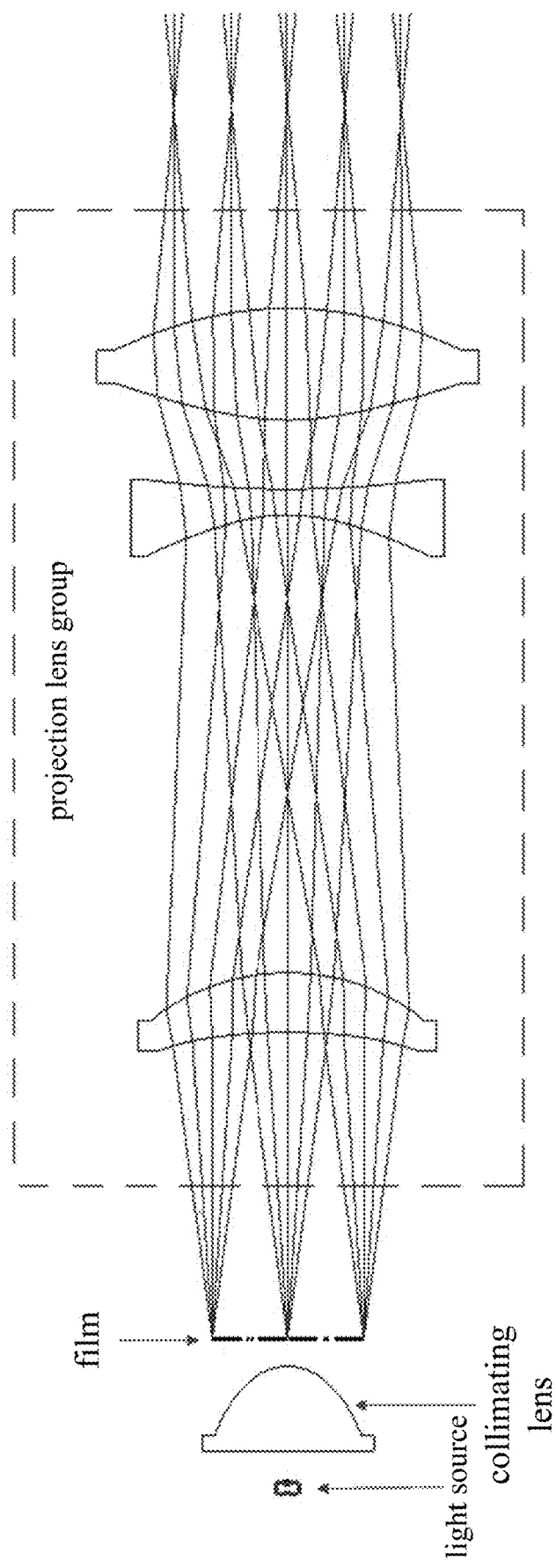
FIG. 1 is a schematic diagram of an imaging light path of a conventional projector light system.
Figure 2:
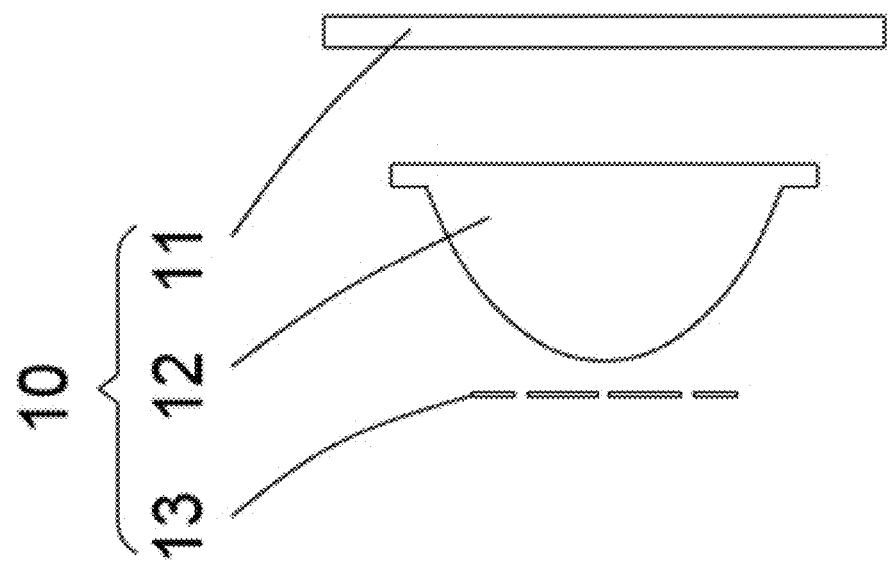
FIG. 2 is a structure diagram of Example 1 according to the present invention.
Figure 2:
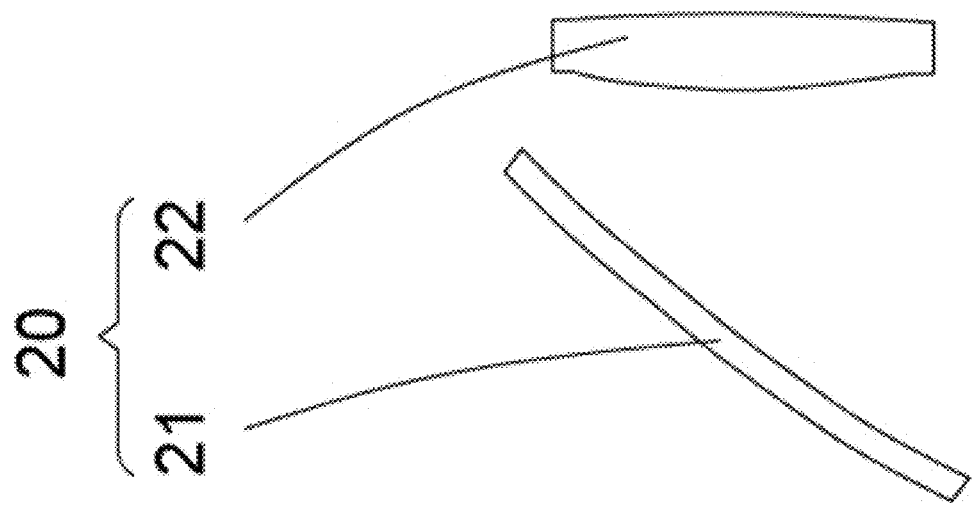

As referred to FIG. 2, the small-sized vehicle-mounted projector light system disclosed in the present invention includes the illuminating module 10 and the imaging module 20, and the light emitted by the illuminating module 10 is deflected after passing through the curved reflector 21. The illuminating module 10 includes the light source 11, the collimating lens 12 and the film 13, which are arranged in sequence along the main optical axis, and the film 13 may be other projecting sources. The imaging module 20 includes the curved reflector 21 and the first imaging lens 22, and the curved reflector 22 is a concave mirror with positive focal power, so such arrangement of the concave reflector with positive focal power enables the lens structure with positive focal power required in the conventional projector light system to be shrunk. No occurrence of chromatic aberration in the curved reflector 21 enables the color performance of the projecting light spot finally formed to be improved. The illuminating module 10 is positioned on one side of the reflective surface of the curved reflector 21, and the main optical axis of the illuminating module 10 passes through the reflective surface of the curved reflector 21. The first imaging lens 22 is positioned on one side of the reflective surface of the curved reflector 21, that is, the first imaging lens 22 is positioned on the main optical axis of incident light or the main optical axis of emergent light, which is respectively into or out of the reflective surface of the curved reflector 21.

During normal operation, the light emitted by the light source 11 is converged and collimated by the collimating lens 12 and then reaches the film 13. After passing through the film 13, the light can form a specific pattern, and strikes the reflective surface of the curved reflector 21. The curved reflector 21 converges and reflects the incident light with a specific pattern, and cooperates with the first imaging lens 22 positioned on the side of incident light or the side of emergent light, of the curved reflector 21, to make an adjustment. Finally, a projecting light spot with low chromatic aberration can be formed.

In the projector light system provided by the present invention, deflecting the light path enables the axial light path to be shortened, and effects the reduction of the space in the one-way dimension, less limitation of the installation space, and more convenience for the vehicle-mounted application as well as the arrangement design of the door space of automobiles when arranged on the door. Differing from the projector light system that uses a flat mirror to deflect the light path, the curved reflector 21 in the present invention also has positive focal power, which can effectively decreasing the number of the lenses with positive focal power, thereby effectively reducing the volume and the weight of the projector light system. Therefore, compared with the existing projector light, the overall structure is more compact.

Preferably, the reflective surface of the curved reflector 21 is an aspheric surface or a free-curved surface, either of which is rotationally symmetric.

Preferably, the normal line of the curved reflector 21 and the main optical axis of the illuminating module 10 form an included angle α, where 30°≤α≤60°. The light coming from the illuminating module 10 and then striking the curved reflector 21 is the incident light, the angle between the incident light and the normal line is α, and the angle between the emergent light and the normal line is also α. Preferably, the intersection of the normal line of the curved reflector 21 and the main optical axis of the illuminating module 10 is on the reflective surface of the curved reflector 21, so as to effectively improve the reflection effect of the curved reflector 21, ensure that the reflected image is not easily deformed, and enable the size of the curved reflector 21 to be minimized to a maximum limit.

Preferably, providing the effective aperture of the curved reflector is P, the effective aperture of the film is Q, and the equivalent focal length of the imaging module is f, the effective aperture P of the curved reflector conforms to $$\frac{2}{\sqrt{3}}Q < P < 2f,$$

so as to ensure that the curved reflector 21 can completely receive the light from the illuminating module 10 capable of forming a specific pattern, avoid the imperfection of the projecting light spot pattern finally formed, and effect the avoidance of affecting installation and use due to the excessively large volume of the curved reflector 21.

The effective aperture refers to the ratio of the beam diameter of the front lens (which may also be treated as a lens diameter) to the focal length, of each lens unit at full opening of its aperture. It indicates the light-receiving capability of the maximum aperture of the lens unit.

In the present invention, providing the equivalent focal length of the imaging module 20 is f, and the focal length of the curved reflector 21 is F, there is F>f, effectively ensuring that the volume of the imaging module 20 is not excessively large and the imaging effect is guaranteed.

Preferably, the first imaging lens 22 is a convex lens with positive focal power.

The imaging module 20 can be varied in various ways; there are three different variations as follows.

Figure 5:
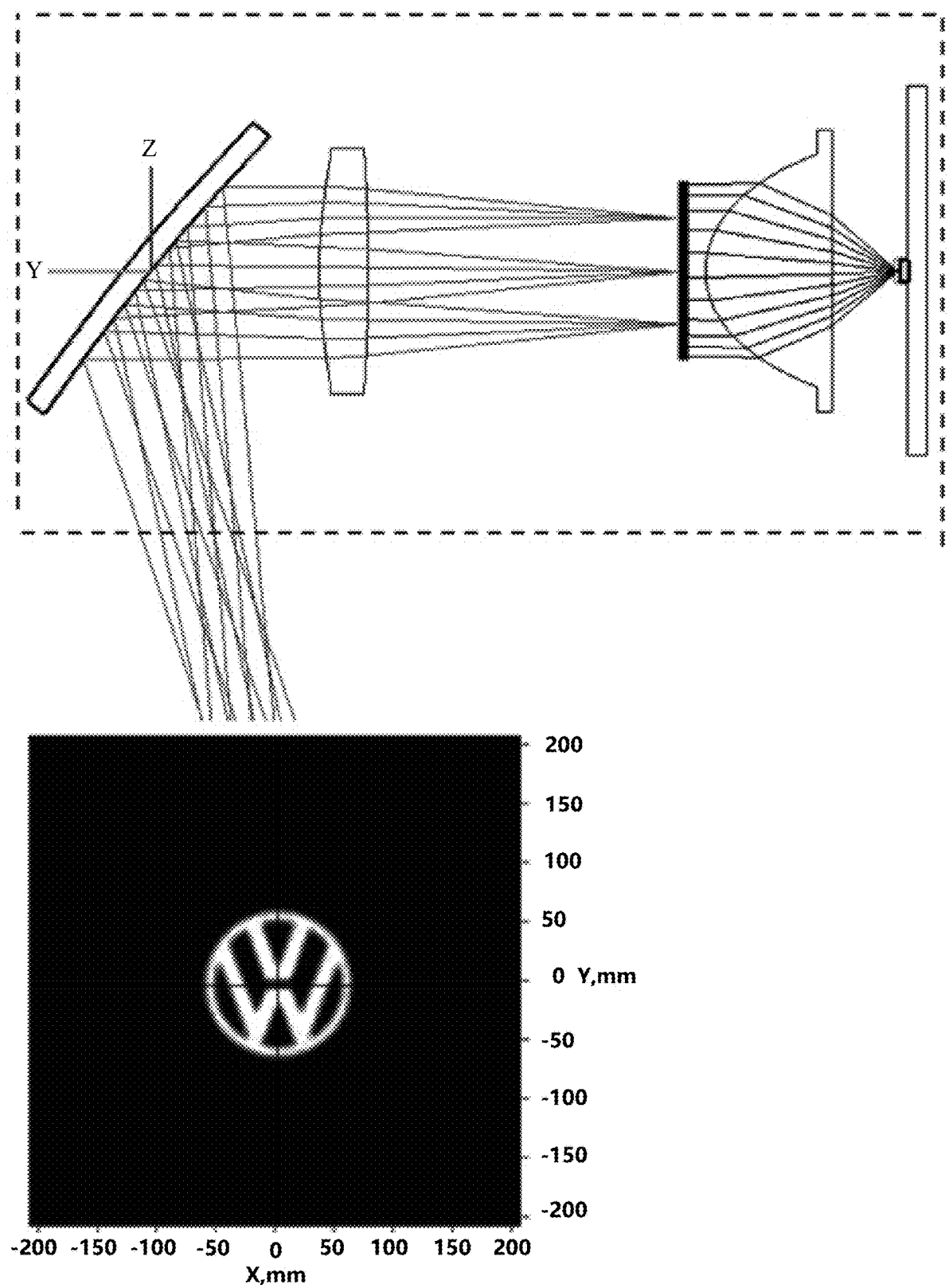
FIG. 5 is a schematic diagram of the light path and the projection light spot of Example 1 according to the present invention.

Example 1, as shown in FIGS. 2 and 5, in the case that the field angle is <30° and the focal length F of the imaging module 20 is >2.5, the first imaging lens 22 is positioned on the reflective surface of the curved reflector 21 close to the illuminating module 10, and the main optical axis of the incident light of the curved reflector 21 is configured to pass through the center of the first imaging lens 22. Such structure is simple, that is, the main optical axis of the illuminating module 10 is configured to pass through the first imaging lens 22.

Figure 3:
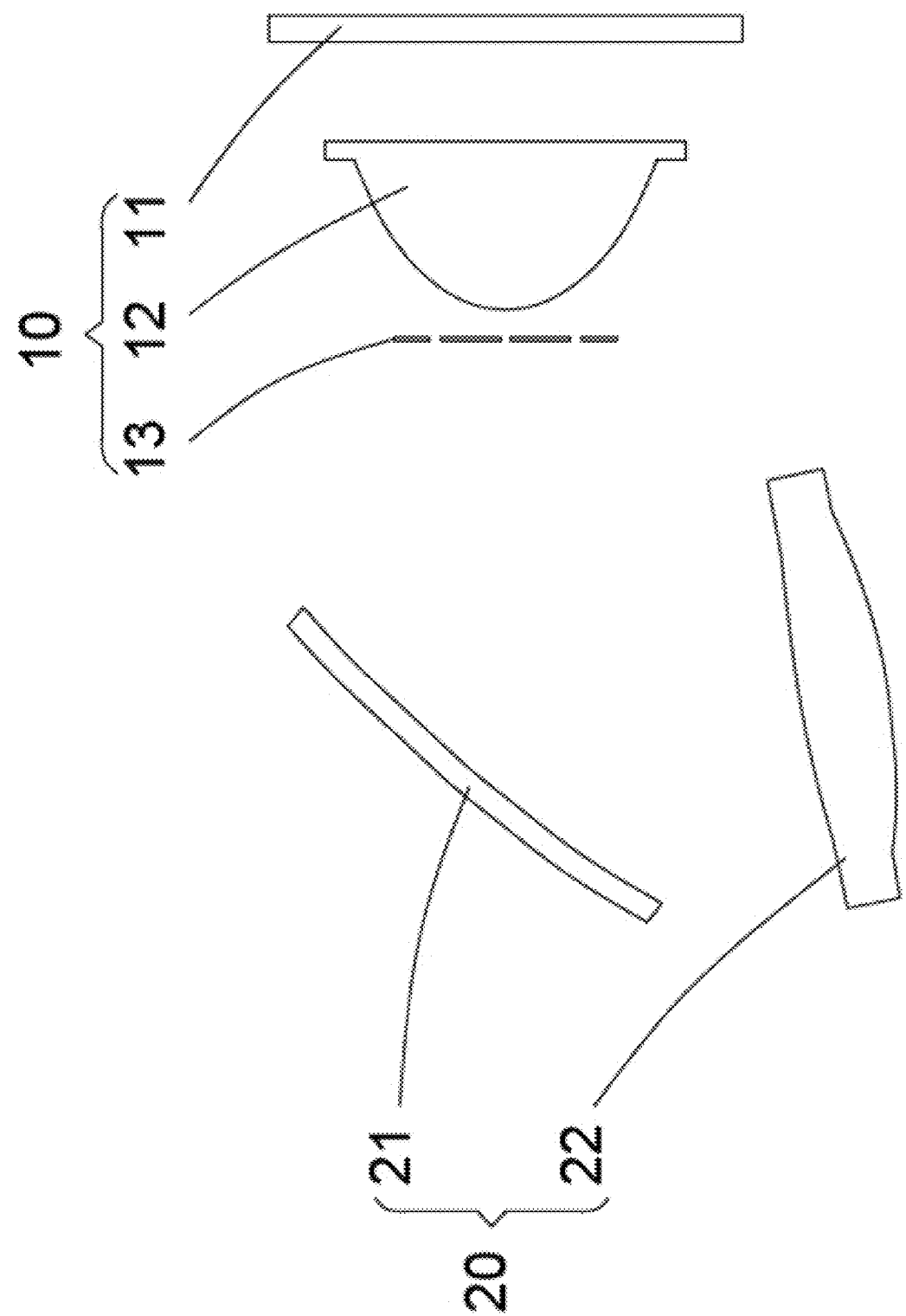
FIG. 3 is a structure diagram of Example 2 according to the present invention.
Figure 6:
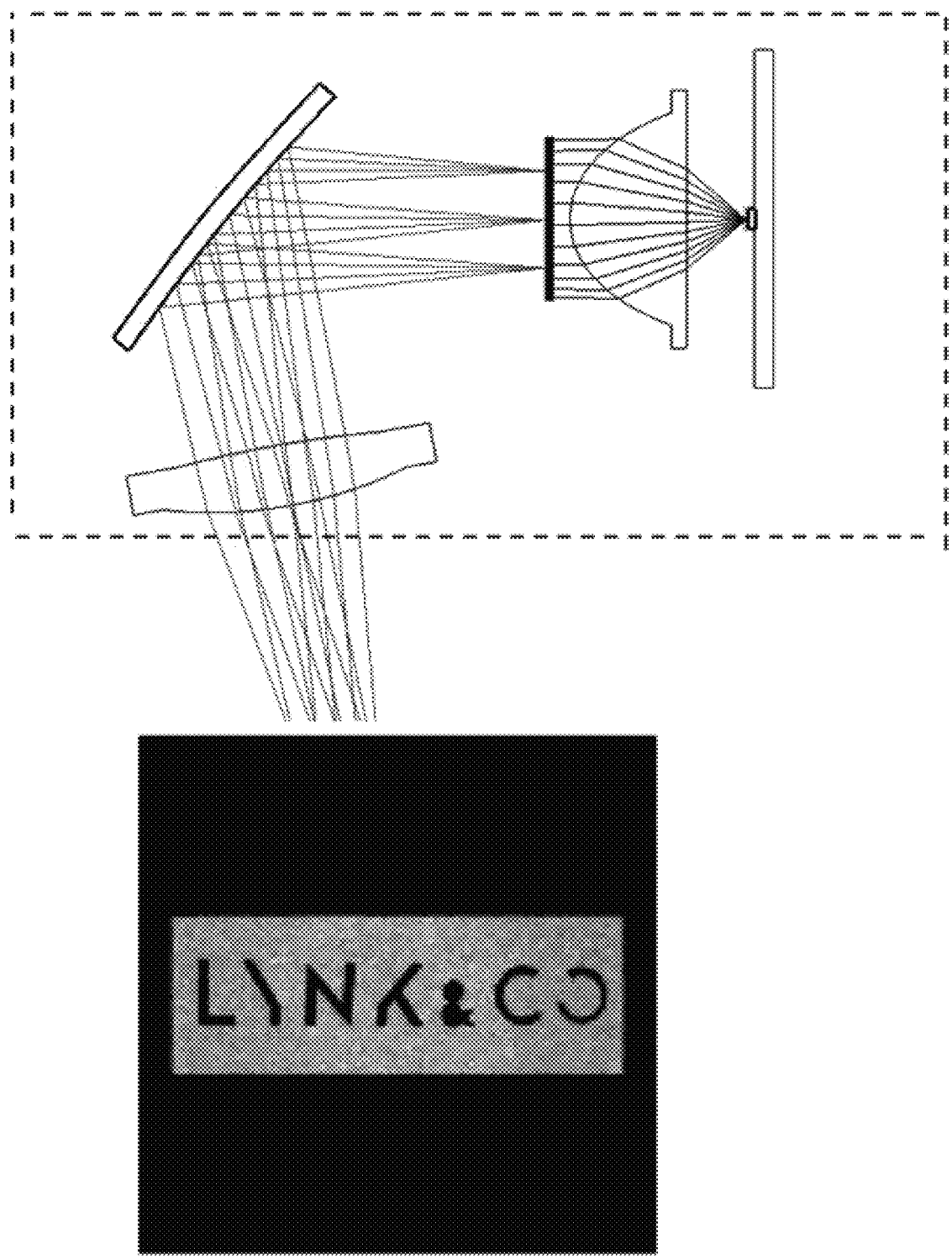
FIG. 6 is a schematic diagram of the light path and the projection light spot of Example 2 according to the present invention.

Example 2, as shown in FIGS. 3 and 6, the first imaging lens 22 is positioned on one side of the reflective surface of the curved reflector 21 far away from the illuminating module 10, and the main optical axis of the emergent light of the curved reflector 21 is configured to pass through the center of the first imaging lens 22.

Figure 4:
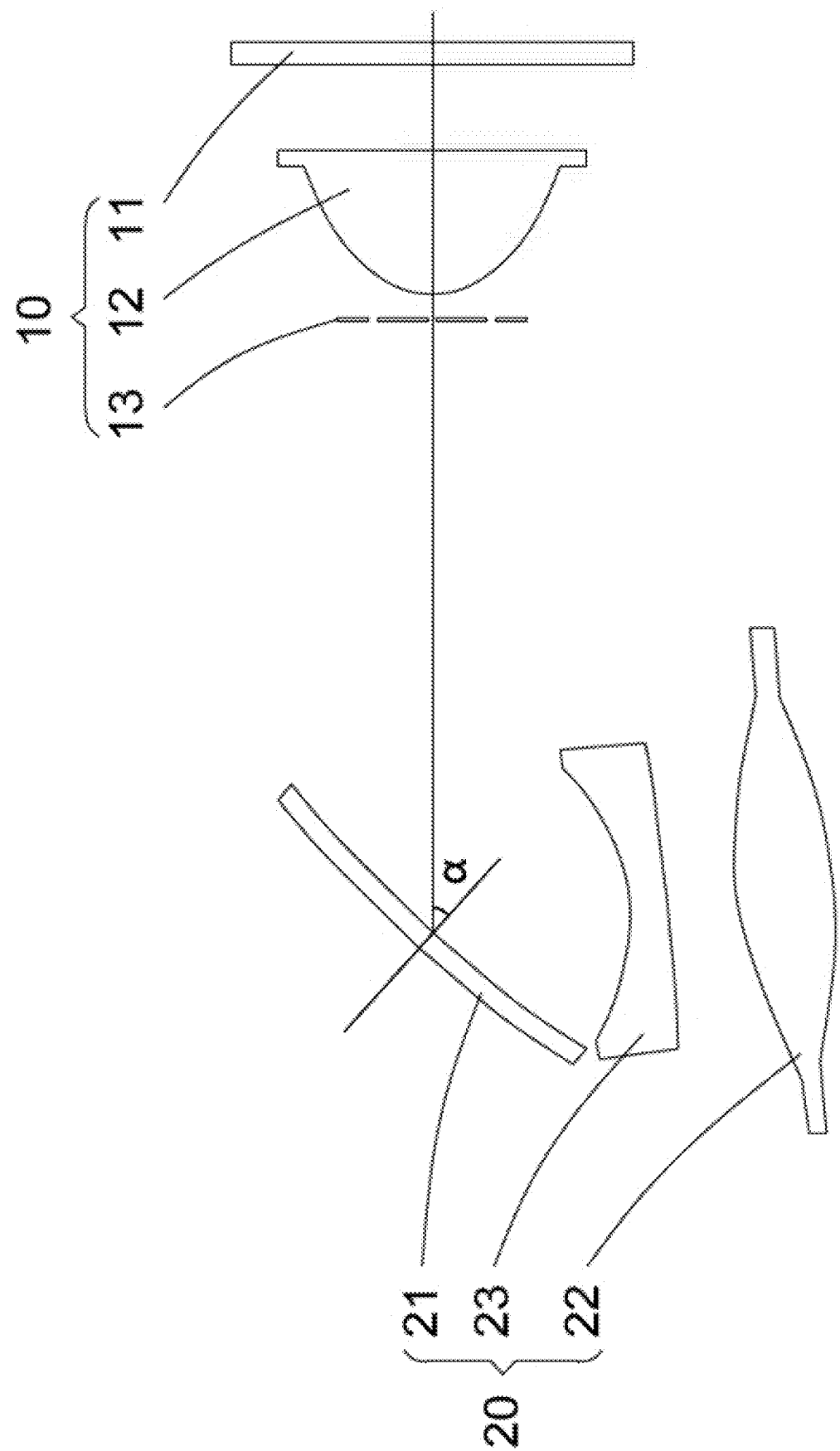
FIG. 4 is a structure diagram of Example 3 according to the present invention.
Figure 7:
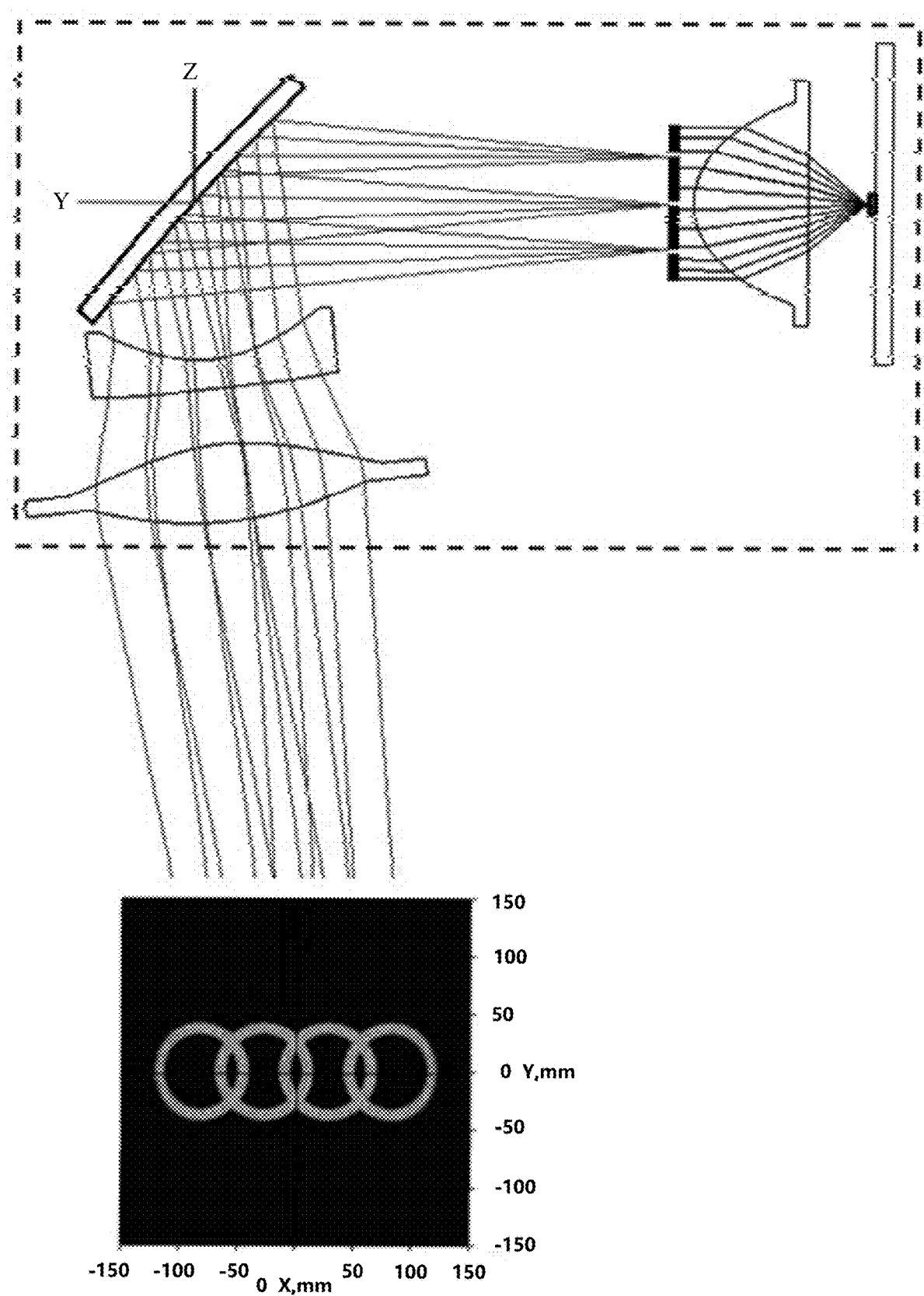
FIG. 7 is a schematic diagram of the light path and the projection light spot of Example 3 according to the present invention.

Example 3, as shown in FIGS. 4 and 7, the imaging module 20 further includes the second imaging lens 23, and the second imaging lens 23 is positioned between the first imaging lens 22 and the curved reflector 21. The number of lenses contained in the imaging module 20 does not exceed three. Preferably, the second imaging lens 23 is a concave lens with negative focal power, which enables effective elimination of dispersion, thereby effectively improving the imaging quality.

The above-mentioned examples only represent several embodiments of the present invention, and the descriptions thereof are specific and detailed, but should not be construed as a limitation on the scope of the patent of the present invention. It should be pointed out that a person skilled in the art can also make several modifications and improvements, which all belong to the protection scope of the present invention, without departing from the concept of the present invention. Therefore, the protection scope of the present invention should be subject to the appended claims.

What is claimed is:

1. A small-sized vehicle-mounted projector light system comprising an illuminating module (10) and an imaging module (20), wherein said illuminating module (10) includes a light source (11), a collimating lens (12) and a film (13), which are arranged in sequence for producing an image outside of a vehicle; said imaging module (20) includes a curved reflector (21) and a first imaging lens (22), said curved reflector (21) is a concave mirror with positive focal power, the main optical axis of said illuminating module (10) passes through the reflective surface of said curved reflector (21), and said first imaging lens (22) is positioned on one side of the reflective surface of said curved reflector (21).

2. The small-sized vehicle-mounted projector light system according to claim 1, wherein the reflective surface of said curved reflector (21) is an aspheric surface or a free-curved surface, either of which is rotationally symmetric.

3. The small-sized vehicle-mounted projector light system according to claim 1, wherein the normal line of said curved reflector (21) and the main optical axis of said illuminating module (10) form an included angle α, where 30°≤α≤60°.

4. The small-sized vehicle-mounted projector light system according to claim 1, wherein providing the effective aperture of said curved reflector (21) is P, the effective aperture of said film (13) is Q, and the equivalent focal length of said imaging module (20) is f, the effective aperture P of said curved reflector (21) conforms to:

$$\frac{2}{\sqrt{3}} Q < P < 2f.$$

5. The small-sized vehicle-mounted projector light system according to claim 4, wherein providing the focal length of said curved reflector (21) is F, there is F>f.

6. The small-sized vehicle-mounted projector light system according to claim 1, wherein said first imaging lens (22) is a convex lens.

7. The small-sized vehicle-mounted projector light system according to claim 6, wherein said first imaging lens (22) is positioned on one side of the reflective surface of said curved reflector (21) close to said illuminating module (10).

8. The small-sized vehicle-mounted projector light system according to claim 6, wherein said first imaging lens (22) is positioned on one side of the reflective surface of said curved reflector (21) far away from said illuminating module (10).

9. The small-sized vehicle-mounted projector light system according to claim 8, wherein said imaging module (20) further includes a second imaging lens (23), and said second imaging lens (23) is positioned between said first imaging lens (22) and said curved reflector (21).

10. The small-sized vehicle-mounted projector light system according to claim 9, wherein said second imaging lens (23) is a concave lens.

\* \* \* \* \*